June 9, 1953 — P. E. WILLMAN — 2,641,681
COFFEE MAKER
Filed Nov. 10, 1951 — 3 Sheets-Sheet 1
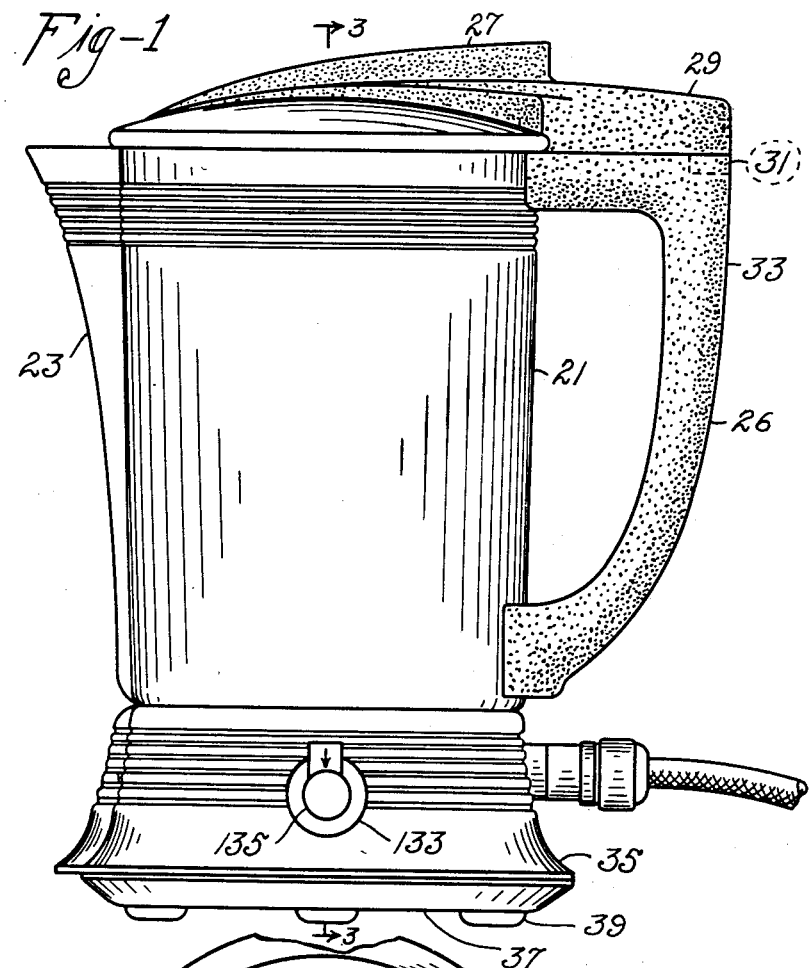
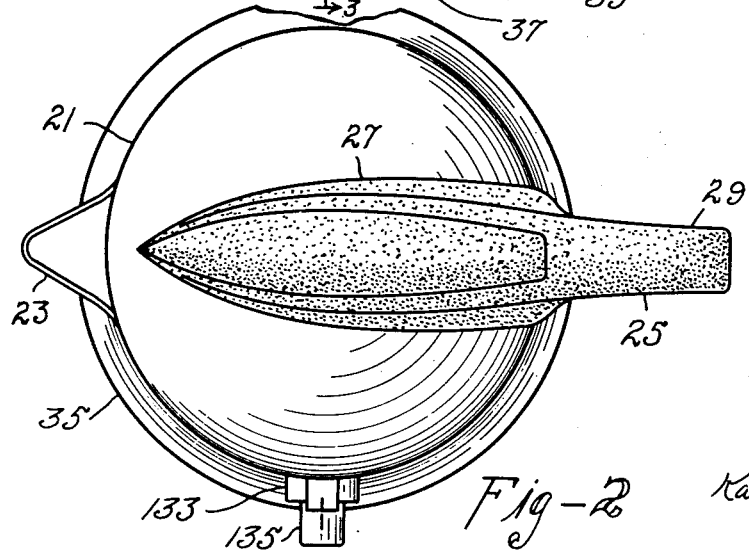
INVENTOR
PHILIP E. WILLMAN
Karl W. Sommermeyer
ATTY.

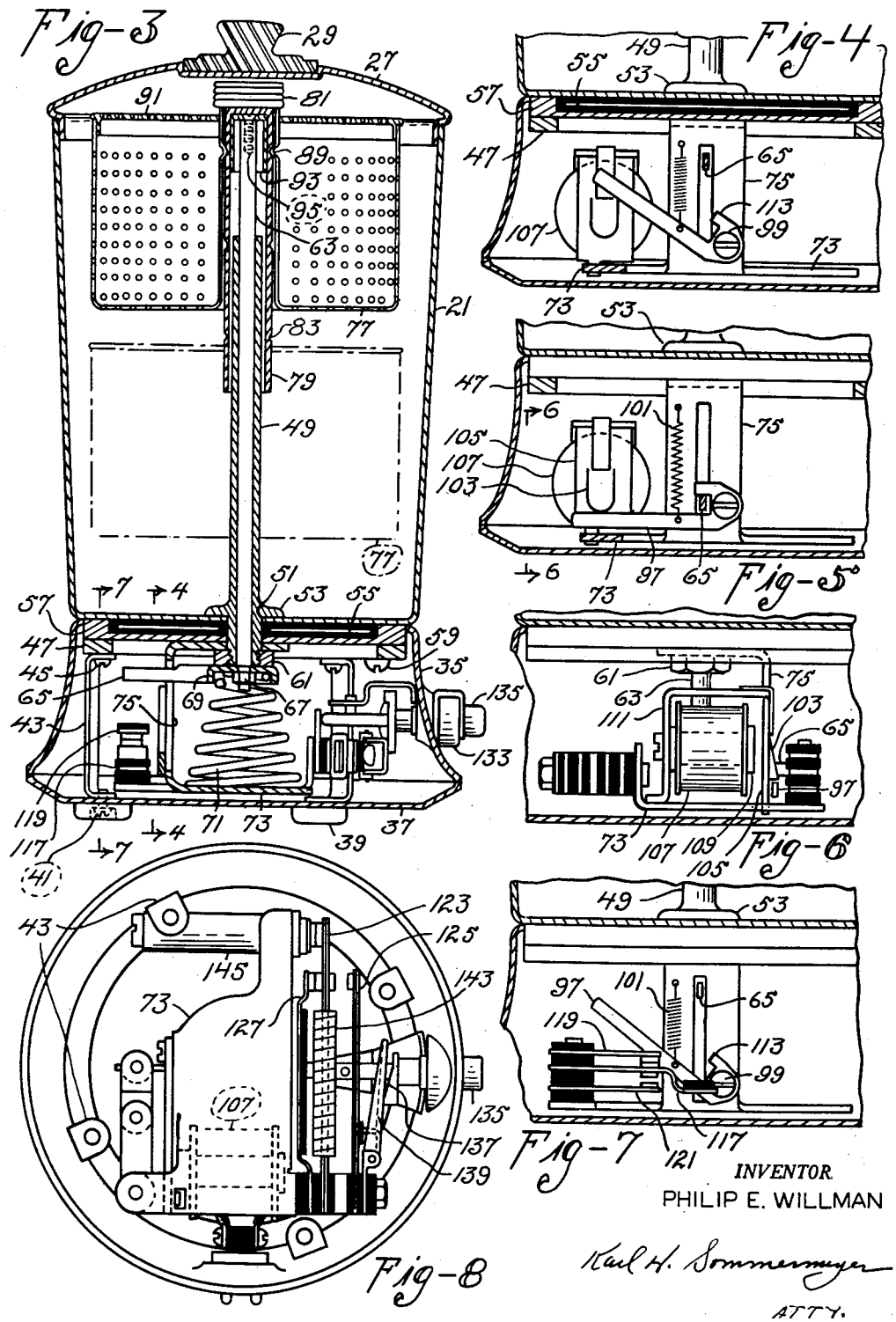

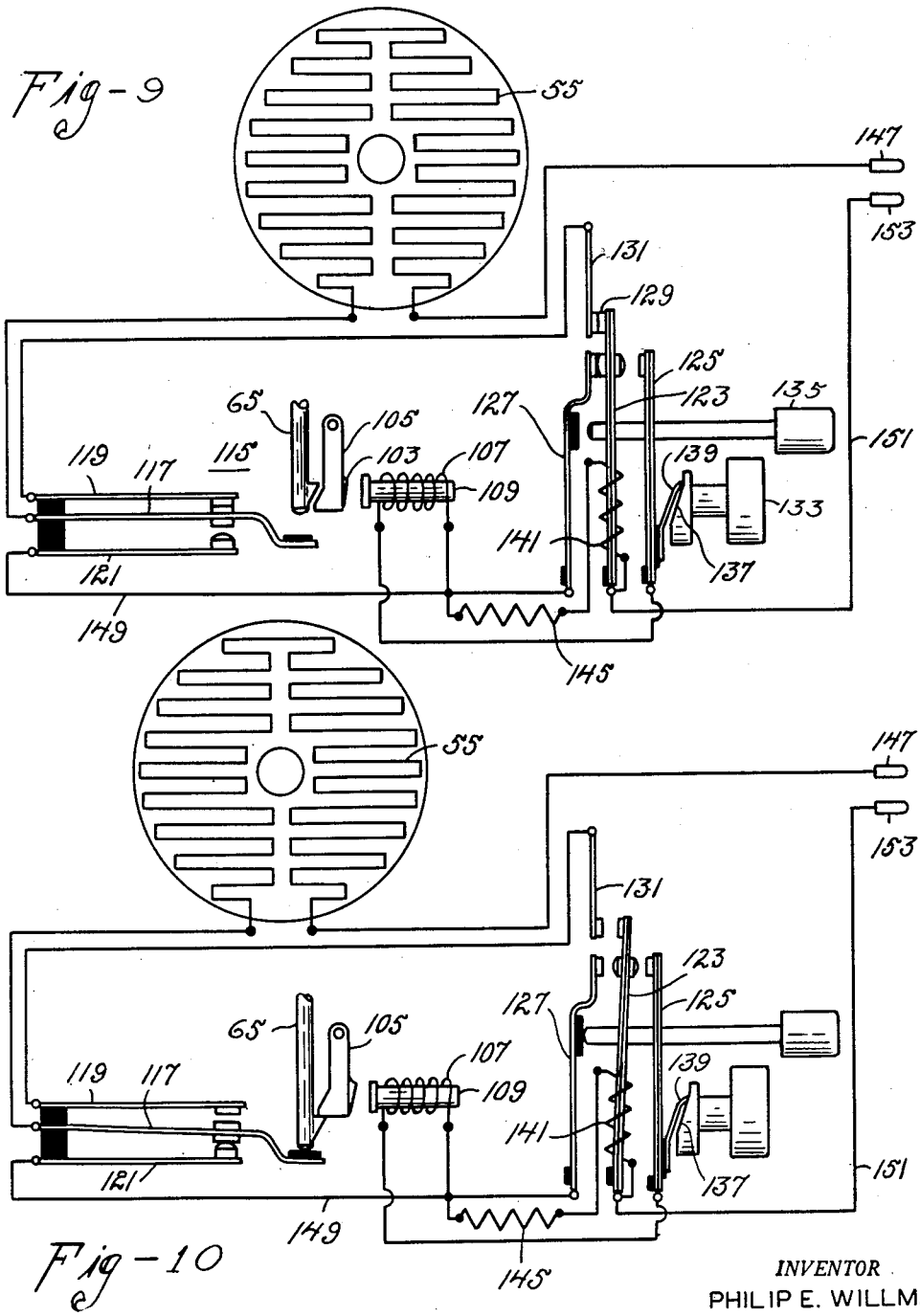

Patented June 9, 1953

2,641,681

UNITED STATES PATENT OFFICE 2,641,681

COFFEE MAKER

Philip E. Willman, Maple Park, Ill., assignor to McGraw Electric Company, Elgin, Ill., a corporation of Delaware Application November 10, 1951, Serial No. 255,796

5 Claims. (Cl. 219—44)

My invention relates to cooking devices, including coffee makers, and to automatic heating and timing controls therefore.

An object of my invention is to provide a coffee maker having a movable coffee grounds basket, an electric heater for water, and a thermal timer and controller for controlling the operation of the basket and heater.

Another object is to provide a thermal controller in such a coffee maker for heating water with the coffee basket submerged until a high temperature, suitable for brewing, is reached and then until sufficient time for steeping has elapsed, for then lifting the coffee basket from the brew, and for then maintaining the brew at a lower temperature suitable for serving.

Another object is the provision of a thermal controller for bringing a controlled device, such as a cooker, up to a pre-set temperature, and then after a pre-set delay, cooling it and holding it at a pre-set lower temperature.

Another object is the provision of a simple and reliable mechanism for such a controller.

Another object is the provision of two bimetal bars operable as a combined thermal timer and temperature regulator for effecting such a control operation.

Another object of my invention is to provide adjustable thermal means for controlling the length of the steeping time.

Still another object of my invention is to provide an electric heater thermally controlled by two bimetal bars adjusted by two knobs to provide the proper temperature in accordance with the number of cups of coffee being brewed.

Other objects will be apparent from the following description of a specific coffee maker embodying my invention, which illustrates the manner in which the invention may be put into practice. In the drawings:

Figure 1 is a view in side elevation, of a coffee maker embodying my invention;

Fig. 2 is a top plan view of the coffee maker shown in Fig. 1;

Fig. 3 is a vertical sectional view taken on the line 3—3 of Fig. 1, the position of the parts being shown before the start of a heat-up and steeping cycle;

Fig. 4 is a fragmentary sectional view on the line 4—4 of Fig. 3, showing the position of the latching means before the start of a heat-up and steeping cycle;

Fig. 5 is a view similar to Fig. 4 except that the parts are shown in latching position as when the coffee basket has been depressed;

Fig. 6 is a fragmentary, vertical, sectional view taken on the line 6—6 of Fig. 5;

Fig. 7 is a fragmentary, vertical, sectional view taken on the line 7—7 of Fig. 3;

Fig. 8 is a bottom plan view of Fig. 3 with the bottom plate removed;

Fig. 9 is a diagram of the circuits of my improved coffee pot before or after a brewing cycle; and, Fig. 10 is a diagram of the control circuits during a brewing period, after the water has reached the boiling point and during the timing cycle.

As is shown in Figs. 1 and 2, my improved coffee maker comprises a pot 21, spout 23, a handle 25, a cover 27 having a lifting handle 29 preferably of a heat-insulating material. The handle 29 has a depending projection 31 at its outer end that fits into a cooperating recess 33 in the upper outer end of handle 25. An open-bottom supporting base 35 contains the operating and the control mechanisms which will hereinafter be described, and is closed by a plate 37. Screws 41 (Fig. 3) hold the supports 39 and member 37 to bars 43 which are fastened by screws 45 to an annular member 47 adjacent the bottom of the pot.

As may be seen in Fig. 3, a basket-supporting tube 49 sets on its flange 53 in an opening 51 in the bottom of pot 21. An electric heater 55 is insulatedly held against the under side of the pot bottom by a plate 57 and screws 59 which also hold annulus 47. A nut 61 holds tube 49 in place and clamps the center of heating element 55. A rod 63 reciprocates in tubular member 49. At its lowermost end a horizontal bar 65 is held thereon by a nut 67. Bar 65 has a part 69 of inverted cup shape for receiving the upper smaller end of a spiral expansion spring 71 which normally holds the rod 49 in an elevated position. The lower end of spring 71 rests against the lower horizontal part 73 of a bracket plate 75, the upper end portion of which is held by nut 61.

A perforated coffee basket 77 is mounted on a long thimble 79 which is provided with a heat insulating handle 81 and a plurality of spaced annular grooves 83 adapted to receive and hold basket 77. The central tubular portion of basket 77 has a plurality of longitudinal slots for making it resilient, and a necked portion 89 which can spring into any one of the corresponding annular grooves 83 in thimble 79 for supporting the basket at three separate heights. A cover 91 completes the basket. A small thimble 93 fastened to the upper end of rod 63 by a screw 95 fits into grooved thimble 79 for giving it a firm support. For disassembly the thimble 79 and basket are lifted off rod 49 and thimble 91, and basket is then pulled down off grooved thimble 79.

Coffee is to be made by immersing the basket with a load of coffee grounds during heating and steeping and then lifting it out of the water automatically by means of the control mechanism now to be described. The three grooves 83 permit the height of the basket to be adjusted according to the amount of water being used. Having been loaded and set in the correct groove so that it is just above the water, the basket is lowered by manual pressure on handle 81. This action immerse the coffee grounds in the water, and by lowering rod 49, compresses spring 71.

Bar 65, as it moves down with rod 49, is guided by a slot in bracket 75 (Figs. 4 and 5) into engagement with a lever arm 97 which pivots on screw 99 on bracket 75 and normally held up by spring 101. Bar 65 pushes the lever 97 down from the position of Fig. 4 to that of Fig. 5 where it catches under a projecting part 103 on a pivotally mounted latch 105 which constitutes the armature of an electromagnet 107 (Figs. 5 and 6). Accordingly, the coffee grounds in the basket 77 are held submerged, against the tendency of spring 71 to lift them, by lever 97 and magnetic latch 105. Magnet 107 is adapted to be energized for releasing the basket at the proper time under control of a thermal control means that is best described in connection with Figs. 9 and 10 but which is shown also in Figs. 3 to 8. This thermal control constitutes an important part of my invention. A single-pole double-throw switch 115 (Figs. 7, 9 and 10) is so constructed and adjusted that the central contact arm 117 is normally biased upward against a substantially fixed contact arm 119. When bar 65 is moved down it pushes contact arm 117 away from contact 119 into engagement with a lower contact arm 121. Contact arms 117, 119 and 121 are insulatedly supported on a horizontal projection of plate 73.

I provide a pair of parallel thermal bimetal bars constituting a main bimetal bar 123 and an auxiliary or compensating bimetal bar 125. Bimetal bar 123 is provided with three contact members. One normally engages a contact on a spring contact arm 127 which is biased in a clockwise direction as seen in Figs. 8, 9 and 10, so that it tends to follow the flexing of bimetal bar 123 which flexes in a clockwise direction upon being heated up. Another contact is adapted to engage a contact on bimetal bar 125, but is normally spaced therefrom as shown in Fig. 9. A third contact 129 is adjacent the free outer end thereof, which contact is adapted to engage with a contact on a contact arm 131 insulatedly supported on plate 73, shown in Figs. 3 to 8.

As is shown best in Figs. 6 and 8, the bars 123, 125 and 127 are insulatedly supported by an upwardly extending lug integral with member 73. Arm 139 (see particularly Fig. 8) is pivotally mounted on the same lug as supports bimetal bar 123 and contact arms 125 and 127, all of which, together with the electric-insulating blocks therebetween, are secured by a short rod having a nut screwed thereon.

Bimetal bars 123 and 125 are adapted to be heated by the air within base 35 during the operation of heater 55. Since my coffee pot is designed to make coffee, say two cups as a minimum, as well as eight cups as a maximum, it is evident that the length of time required for heating element 55 to bring the temperature of the water in the pot up to a value on the order of 205 to 212 degrees Fahrenheit will depend in part on the amount of water being heated, and so will the amount of temperature rise of the air in lower casing 35. Accordingly I provide a small knob 135 adjacent the lower end of support 35 so that the heating time controlled by the contacts 123—127 (as will be described presently) may be set for the number of cups of water that are placed in the coffee pot. It controls the cut-off temperature of the bimetal 123 according to time required for heating various numbers of cups of water. For example, a pointer on knob 135 may indicate 2, 4, 6 or 8 cups. I also provide a larger knob 133 for adjusting the spacing of bimetals 123 and 125 for thereby adjusting the time during which the coffee grounds will steep in the heated water, which may for example be marked light and dark. Knob 133 controls a cam surface 137, which cam surface is operatively engaged by an arm 139. This arm 139 is connected with compensating bimetal bar 125 (Figs. 8 and 9) so that, for example, if knob 133 is turned in a right-handed direction, the bimetal bar 125 is pushed to the left (counterclockwise) closer to bimetal bar 123.

I provide an auxiliary heating coil 141, wound on the main bimetal bar 123 and covered by heat- and electric-insulating material, such as glass fiber 143. Conveniently, heater 141 may have a resistance of 40 ohms, and a small auxiliary resistor 145, having a resistance on the order of 295 ohms, also located in the lower base member 35, may be electrically connected in series with it.

The circuit and operation of my control are shown in Figs. 9 and 10. Fig. 9 shows the condition of the apparatus before the coffee basket is pushed down. Operation is initiated by pushing down the coffee basket and letting it be held by magnetic latch 105, as indicated diagrammatically in Fig. 10. Then current is supplied from terminal pin 147 through pot heater 55, contacts 117 and 121 (as shown in Fig. 10), contact 127 and bimetal 123 (as shown in Fig. 9) to terminal pin 153. Pot heater 55 thereby is energized for heating the water in the pot 21, the air in the base 35, and thereby the two bimetal bars 123 and 125. These two bimetal bars are of similar composition and thickness, and being heated similarly at this stage of the operation they deflect to the right at substantially the same rate. Spring contact 127 follows bimetal 123 to keep the circuit closed, and the action continues until spring 127 stops against the pin of adjusting knob 135 to end the water-heating part of the operation. At this point the contacts in bimetal 123 and spring 127 separate to cut resistor 145 and the bimetal heater 141 into the circuit. The resistance of pot heater 55 is so low that it now generates very little heat. If knob 135 has been set properly according to the quantity of water in the pot the water should now be at a suitable temperature for making coffee, say 205° F.

Up to this point the bimetals 123 and 125 have been bending to the right together so that the spacing between them has remained approximately constant. Now the heat supplied by heater 141 to bimetal 123 carries its temperature above that of bimetal 125 for slowly closing the gap between them. During this operation the coffee grounds are steeping in the hot water, and the circuits are in the condition shown in Fig. 10.

After a time, say three minutes, determined by the setting of knob 135, the contact on bimetals 123 engages that on 125 for energizing magnet 107. The current for the magnet, like that for heater 141, is drawn through heater 55. Magnet 107 immediately releases lever 65 so that spring 71 (Fig. 3) lifts the basket 77 out of the water to end the steeping operation. Lever 65 also releases switch arm 117 so that it disengages contact arm 121 for deenergizing heater 141 and magnet 107 and engages contact arm 119 for establishing a connection to contact 131. Heater 55 is now deenergized but the water is still at a high temperature, say 200° F. As it cools, bimetal 123 also cools and deflects to the left until contact 129 engages 131 for reenergizing heater 55. The circuit is now from connector pin 147, through heater 55, contacts 117 and 119, contacts 131 and 129, bimetal 123 and connector pin 153. Under this condition of the circuit, bimetal 123 repeatedly opens and closes contacts 129—131 for turning heater 55 on and off for holding the pot at a substantially constant temperature suitable for keeping the coffee brew at a desirable serving temperature, say 160° F.

The device embodying my invention thus provides a relatively simple and highly efficient means for brewing any desired quantity of coffee up to the maximum in a relatively small pot, the construction of the parts of my improved coffee maker being such that the size is appreciably reduced. My improved control makes it unnecessary to provide an auxiliary heating unit for keeping the brew warm since my temperature-controlled thermal elements are effective to control the energization of a main heating element for that purpose. Further, I have provided a simple and reliable, adjustable thermal timer for controlling the operations of heating the water, steeping the grounds, and keeping the brew warm.

It will be apparent that my invention is capable of modifications and variations within the scope of the appended claims.

I claim:

1. In combination in a cooking device or the like, heating means, two similar thermally responsive elements similarly exposed to the heat of said heating means for responding similarly thereto, a first set of contacts operable by one of said elements at a high temperature, a second set of contacts operable by one of said elements at a low temperature, a timing heater for additionally heating at least one of said elements and heating that one more than the other in response to operation of said first set of contacts at said high temperature, a change-over switch operated jointly by said two elements in response to their dissimilar responses to heat from said timing heater for deenergizing said timing heater and connecting said heating means in circuit for control by said second set of contacts at said low temperature.

2. The combination of claim 1 wherein said two thermally-responsive elements are bimetal bars.

3. The combination of claim 1 wherein said two thermally-responsive elements are bimetal bars and said first and second contacts are operated by the same one of said bimetal bars.

4. The combination of claim 1 wherein said change-over switch includes an electric relay controlled by a pair of cooperating contacts one of which is moved by each of said thermally-responsive elements so that said pair of contacts engage and disengage in response to dissimilar operation of said two thermally-responsive elements.

5. In combination in a coffee maker or the like, a container for water, an electric heater therefore, a basket submersible in water in said container, lifting means for moving said basket out of submerged position, a first bimetal bar responsive to the temperature of said container, two sets of contacts operable thereby at different temperatures, a change-over switch operable when said basket is submerged for causing the higher-temperature set of said contacts to control said heater for energizing it, a second bimetal bar, a timing heater for one of said bars, timer contacts jointly operated by said two bars, said higher-temperature contacts being operable to reduce the rate of energization of said container heater and energizing said timer-heater in response to said container reaching that higher temperature, said timing contacts being operable by the dissimilar responses of said two bimetal bars to said timing heater for actuating said lifting means and for operating said change-over switch to connect the container-heater to the lower-temperature set of contacts operable by said first bimetal bar for control thereby.

PHILIP E. WILLMAN.

References Cited in the file of this patent

UNITED STATES PATENTS

| Number | Name | Date |
| --- | --- | --- |
| 1,887,848 | Peirce | Nov. 15, 1932 |
| 2,076,096 | Samuels et al. | Apr. 6, 1937 |
| 2,209,831 | Schurig | July 30, 1940 |
| 2,281,319 | Newell | Apr. 28, 1942 |
| 2,427,444 | Colombo | Sept. 16, 1947 |
| 2,504,728 | Purpura | Apr. 18, 1950 |